United States Patent
Galvin et al.

(10) Patent No.: US 11,970,648 B1
(45) Date of Patent: Apr. 30, 2024

(54) METHOD FOR INCREASING WATER PERMEABILITY IN FIRE AFFECTED SOILS

(71) Applicants: Patric N. Galvin, Evergreen, CO (US); David Michael Cilia, Calistoga, CA (US)

(72) Inventors: Patric N. Galvin, Evergreen, CO (US); David Michael Cilia, Calistoga, CA (US)

( * ) Notice: Subject to any disclaimer, the term of this patent is extended or adjusted under 35 U.S.C. 154(b) by 227 days.

(21) Appl. No.: 17/675,335

(22) Filed: Feb. 18, 2022

Related U.S. Application Data

(60) Provisional application No. 63/150,711, filed on Feb. 18, 2021.

(51) Int. Cl.
| | | |
|---|---|---|
| *C09K 17/00* | (2006.01) | |
| *A01N 63/50* | (2020.01) | |
| *C09K 101/00* | (2006.01) | |

(52) U.S. Cl.
CPC ............ *C09K 17/00* (2013.01); *A01N 63/50* (2020.01); *C09K 2101/00* (2013.01)

(58) Field of Classification Search
CPC ..... C09K 17/00; C09K 2101/00; A01N 63/50
USPC ........................................................ 405/264
See application file for complete search history.

(56) References Cited

U.S. PATENT DOCUMENTS

| | | | | |
|---|---|---|---|---|
| 9,554,502 B2 * | 1/2017 | Madsen | ................... | A01C 1/06 |
| 9,944,854 B2 * | 4/2018 | Huang | ................... | A01B 79/02 |

FOREIGN PATENT DOCUMENTS

| | | | | | |
|---|---|---|---|---|---|
| AU | 2020329942 A1 | * | 2/2022 | ............ | A01N 63/20 |
| CN | 109266363 B | * | 3/2021 | ............ | A01B 79/02 |
| KR | 20140147402 A | * | 12/2014 | | |

* cited by examiner

*Primary Examiner* — Frederick L Lagman
(74) *Attorney, Agent, or Firm* — Edwin H. Crabtree; Ramon L. Pizarro

(57) ABSTRACT

A method for increasing water permeability, improving soil structure, and enhanced plant growth in a fire affected soil by sampling a previously fire affected and non-affected soil in the same area as the fire affected soil. The method includes determining the correct microbes or enzymes to be applied to the fire affected soil is based on the sampling of the previously fire affected soil and the non-fire affected soil. Also, the method includes applying the correct microbes or enzymes to the fire affected soil for accelerated plant growth. Further, the sampling of the previously fire affected soil includes determining what are the best types of organisms present and associated with heat-condensed organic layers or heat induced hydrophobicity.

16 Claims, No Drawings

METHOD FOR INCREASING WATER PERMEABILITY IN FIRE AFFECTED SOILS

BACKGROUND OF THE INVENTION

(a) Field of the Invention

This invention relates to a method for increasing water permeability, improving soil structure, and enhancing plant growth in fire affected soils and more particularly, but not by way of limitation, to introducing microbial species or enzymes identified or derived from a location specific area or a non-location specific area.

(b) Discussion of Prior Art

One of the negative long-term effects of fire events in forests and other undeveloped areas is a pronounced increase in soil water repellency. Increased water repellency in fire-affected soils severely inhibits the ability of plant species to re-colonize and is correlated to a great increase in flash flooding and landslide incidents. This is due to the formation of water repellent layers in soil.

Water repellency in fire-affected soils is mainly due to radical changes in the physical and chemical properties of the organic fraction. During a fire, soil organic matter is transformed into complex substances, that have strong water repellent properties. These complex organic substances are known as "waxes" or "waxy layers", although the chemical nature of them is not limited to what is referred to as "wax". The waxy layers can be more broadly described as heat-condensed organic compounds or water repellent hydrophobic soils.

The intensity and duration of heat during a fire event is partly responsible for the degree and depth of formation of heat-condensed organic compounds. In addition to transformation and heat-mediated translocation of organic compounds in the soil profile there is a profound disruption and loss of endemic soil microorganisms (MO) in fire-affected soils. The net effect of the changes in fire affected soils is the soils become harder for plant species to recover in these areas due to a loss of the MO as well as the development of water repellency leading to poor water retention and penetration properties of fire affected soils.

Fire affected soils exhibit negative characteristics with respect to water retention and permeability, in part, due to the formation of water repellent heat-condensed organic layers as well as heat induced hydrophobicity. These heat-condensed layers are formed in situ, primarily from carbon sources present before a fire event. The degree of formation of heat-condensed organic layers is dependent on the time duration and high temperatures achieved during the fire event. Ultimately, the water-repellent layer, or layers, that form in the soil impede the movement of water into and through soil profiles, resulting in increased likelihood of flash flooding or a mud and landslide event.

Recovery of native soils subsequent to a fire event is dependent on the breakdown of the heat-condensed organic layers and the substances comprising the layers. The breakdown of the heat-condensed organic layers is, in part, mediated by the presence of various fungi and bacteria. The fungi and bacteria secrete and utilize natural wetting agents or bio-surfactants that facilitate the breakdown of water-repellent, heat-condensed, organic materials. In addition, soil MO produce enzymes that are capable of breaking down the heat-condensed organic layers. These enzymes render heat-condensed organic material into a more suitable substrate for colonization and plant growth as well as rendering heat-condensed organic materials into viable carbon sources for the growth and development of soil MO.

Further, the result of any of the processes mentioned above is to render fire affected soils more suitable to the growth and development of "pioneer" plant species or other introduced endemic or non-endemic plant, algal, or fungal species that will further stabilize the soil and ultimately help increase the overall organic content, water permeability, structure and viability of the soil. The only other method for breaking up water repellent soil layers is direct tilling. Soil tilling causes a physical disturbance in the soil layer. Also, tilling is impractical in large forest fires, due to the scale of operation. Therefore, this leads to a conclusion that reintroduction of microbes and enzymes through mass spraying by aerial or land application or by broadcasting solid prill containing the microbes and enzymes is a viable way to provide a faster recovery time for fire affected areas.

SUMMARY OF THE INVENTION

In view of the foregoing, it is a primary objective of the subject invention is to embody different methods, different applications and materials to be applied to a fire affected area for rapid soil recovery.

Another object of the invention is the use of natural enzymes from regional fire affected soils or a combination of "natural" enzymes and genetically modified organisms, GMO, to produce a specific type or several types of enzymes. The enzymes are used to break down water repellent heat-condensed organic compounds and eliminate hydrophobicity in the fire affected soil.

These and other objects of the present invention will become apparent to those familiar with different types of treating fire affected soils, when reviewing the following detailed description, and elements as herein described, and more particularly defined by the claims, it being understood that changes in the embodiments to the herein disclosed invention are meant to be included as coming within the scope of the claims, except insofar as they may be precluded by the prior art.

DESCRIPTION OF THE PREFERRED EMBODIMENTS

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

Because of a danger of introducing foreign, non-endemic, microbes or enzymes into a land area, which can cause unknown harm, the following is suggested for building up a location-specific formula for treating a fire affected soil.

As a fire is extinguished and it is determined that re-growth of plants needs to be accelerated, samplings of previously fire affected soils in a same region and in the years subsequent to a fire event shall be employed. The samplings are:

1. Types of organisms present and associated with heat-condensed organic layers,
2. Distribution of organisms in a vertical profile of fire affected soils,
3. Temporal distribution of the same organisms, plotted with their distribution in a given soil profile, 4. Types of enzymes and/or enzyme cofactors that may exist that ultimately break down a waxy layer.
5. Types of natural wetting agents or bio-surfactants associated with MO endemic to the region to be treated.
6. Method of sampling water repellent layers.

After identifying groups and types of microbes that are associated with breaking down water repellent heat-condensed organic compounds, the organisms will be grown or fermented in-vitro in batch or a continuous flow culture system. The resulting product, from these fermentations can be applied to the fire affected soils in order to help facilitate the revitalization of the soil. This revitalization provides for increased water permeability by providing increased stabilization and rapid plant growth in fire affected soils.

The subject method for increasing water permeability embodies both the use of natural enzymes from regional fire affected soils and a combination of natural enzymes and genetically modified organisms to break down water repellent heat-condensed organic compounds. The natural and genetically modified organisms can include *Aspergillus* to produce the desired enzymes.

A goal of this invention is to determine the most cost-effective as well as a feasible treatment product or products that can be efficiently be applied to fire affected land over vast areas and at a reasonable cost and produce specific MOs that can be used.

Also, this invention includes the harvesting and culturing of endemic MO from a target site soil on burn area margins in actively aerated, fermentative, or anaerobic processes that utilize the waxy soils as a food source for growth. The carbon food source can be, for example, blackstrap molasses or other suitable organic sources. Further, pH adjustments with an organic acid, such as citric acid, can be incorporated for favoring certain microbes over others.

The practice of "baiting" for carbon source-specific microbes is proposed as a method of surveying, identifying and cultivating MO that can utilize heat-condensed organic materials as a carbon source for remediation of associated water-repellent layers in fire affected soils.

In the fermentations using an artificial wax, such as paraffin, or a natural wax, such as beeswax, lanolin, and a complex mixture of aliphatic hydrocarbons, and heat-condensed organic materials that are harvested from the fire affected areas a MO can be produced and identified that will be specific for the location driven fire affected soils. These fermentations can also have endemic MO from non-fire-affected areas introduced. Also, the addition of endemic micro-flora can help augment the reintroduction of higher plant species by helping to condition the fire affected soil, through the reinoculation of native species lost in fire events. In essence, the invention embodies addressing the loss of native micro-flora in soils after fire events as well as ameliorating the effects of fire on reduced water permeability at the same time.

Further, this invention embodies the use or non-use of either anionic, cationic, "bio-surfactants" or other types of surfactant(s) or a combination thereof, to enhance the penetration of water and desired microbes and/or enzymes into the soil profile thereby enhancing the efficacy of the treatments applied.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The invention claimed is:

1. A method for increasing water permeability in a fire affected soil, the steps comprising:
    sampling a previously fire affected soil in the fire affected soil and sampling the previously fire affected soil, also sampling the types of organisms present and associated with heat-condensed organic layers;
    determining microbes or enzymes to be applied to the fire affected soil based on sampling of the previously fire affected soil; and
    applying the microbes or enzymes to the fire affected soil for accelerated plant growth.

2. The method as described in claim 1 further including, when sampling the previous fire affected soil, also sampling organisms in a vertical profile of the fire affected soil.

3. The method as described in claim 1 further including, when sampling the previous fire affected soil, also sampling for temporal distribution of organisms plotted with their distribution in a given soil profile.

4. The method as described in claim 1 further including, when sampling the previous fire affected soil, also sampling for types of enzymes and/or enzyme cofactors that can break down a waxy layer and fire induced hydrophobicity.

5. The method as described in claim 1 further including, when sampling the previous fire affected soil, also sampling types of natural wetting agents or bio-surfactants associated with microorganisms endemic in the fire affected soil.

6. A method for increasing water permeability in a fire affected soil, the steps comprising:
    sampling a previously fire affected soil in the fire affected soil and sampling the previous fire affected soil, also sampling for types of organisms and associated with heat-condensed organic layers;
    determining microbes or enzymes to be applied to the fire affected soil based on sampling of the previously fire affected soil; and
    applying natural and genetically modified organisms to produce desired microbes or enzymes to the fire affected soil for accelerated plant growth and break down water repellent heat-condensed organic compounds in the fire affected soil.

7. The method as described in claim 6 further including, when sampling the previous fire affected soil, also sampling of organisms in a vertical profile of the fire affected soil.

8. The method as described in claim 6 further including, when sampling the previous fire affected soil, also sampling for temporal distribution of organisms plotted with their distribution in a given soil profile.

9. The method as described in claim 6 further including, when sampling the previous fire affected soil, also sampling for types of enzymes and/or enzyme cofactors that can break down a waxy layer and fire induced hydrophobicity.

10. The method as described in claim 6 further including, when sampling the previous fire affected soil, also sampling types of natural wetting agents or bio-surfactants in the fire affected soil.

11. A method for increasing water permeability in a fire affected soil, the steps comprising:
    sampling a previously fire affected soil in the fire affected soil and sampling the previous fire affected soil, also sampling for types of organisms present and associated with heat-condensed organic layers;
    determining microbes or enzymes to be applied to the fire affected soil based on the sampling of the previously fire affected soil;
    applying natural and genetically modified organisms to produce desired microbes or enzymes to the fire affected soil for accelerated plant growth and break down water repellent heat-condensed organic compounds in the fire affected soil; and harvesting and culturing endemic microorganisms from a target site soil on burn area margins in actively aerated, fermentative, and anaerobic processes to provide waxy soils as a food source for soil growth.

12. The method as described in claim 11 further including, when sampling the previous fire affected soil, also sampling for types of organisms present and associated with heat-condensed organic layers.

13. The method as described in claim 11 further including, when sampling the previous fire affected soil, also sampling of organisms in a vertical profile of the fire affected soil.

14. The method as described in claim 11 further including, when sampling the previous fire affected soil, also sampling for temporal distribution of organisms plotted with their distribution in a given soil profile.

15. The method as described in claim 11 further including, when sampling the previous fire affected soil, also sampling for types of enzymes and/or enzyme cofactors that can break down a waxy layer and fire induced hydrophobicity.

16. The method as described in claim 11 further including, when sampling the previous fire affected soil, also sampling types of natural wetting agents or bio-surfactants in the fire affected soil.

* * * * *